Dec. 26, 1950      W. E. POHL      2,535,370
CINEMATOGRAPHIC MATTE PRINTING
Filed Sept. 28, 1945
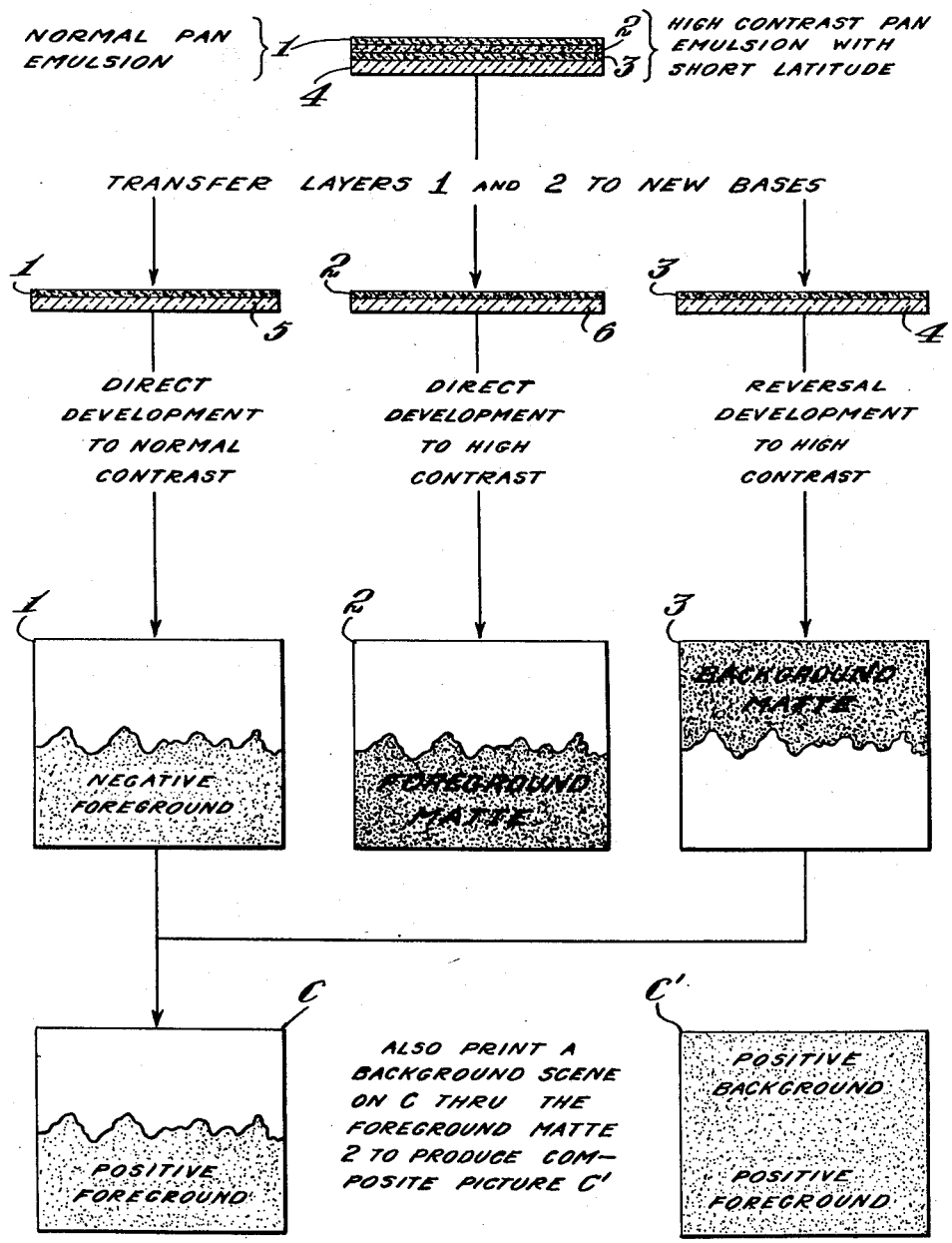

Patented Dec. 26, 1950

2,535,370

UNITED STATES PATENT OFFICE 2,535,370

CINEMATOGRAPHIC MATTE PRINTING

Wadsworth E. Pohl, Los Angeles, Calif., assignor to Technicolor Motion Picture Corporation, Hollywood, Calif., a corporation of Maine Application September 28, 1945, Serial No. 619,121

5 Claims. (Cl. 88—16)

This invention relates to the use of traveling mattes in printing motion pictures in which the foreground and background of the scenes are separately photographed on separate film. In printing the foreground action a background matte is employed which obstructs light from passing through to the background areas of the printed film, and in printing the background a foreground matte is employed to obstruct light from passing through to the foreground areas of the printed film.

Heretofore it has been customary to photograph the background in the usual way and, on separate film, to photograph the foreground action against a black background. The latter film is then used to prepare a traveling matte by making a positive print on contrasting film and then developing the film to a high gamma so that the areas of the matte film which correspond to the background are opaque and the areas corresponding to the foreground are transparent. This background matte is then used to print a foreground matte which is opaque in the foreground areas and transparent in the background areas so that when superposed over the background film in printing the background the foreground areas are not printed.

Objects of the present invention are to produce foreground and background mattes which are precisely the same size and exactly complementary to each other, to reduce the number of printing and developing stages, and to produce composite pictures which do not betray the fact that foreground and background actions were exposed separately.

In one aspect the present invention involves a multilayer film having a picture layer which has normal contrast for recording a scene and a matte layer which has high contrast and short latitude for exposing a matte, the two layers being interconnected so that they may be stripped apart for separate development, whereby the layers may yield a normal picture and a matte respectively, notwithstanding they are exposed with the same light beam for the same length of time.

In another aspect of the invention a multilayer film is exposed to the foreground and background parts of a scene in which one part reflects much more light than the other, to form latent images in different layers respectively, after which the layers are separated, one layer being developed to normal contrast for depicting one part of the scene and another layer being separately developed to high contrast for use as a matte in blocking out one part while printing the other part of the composite picture. The unequal exposure of the foreground and background may be accomplished either by making one ground black and under-illuminating it or by making one ground white and over-illuminating it. Usually the background part of the scene is black and under-illuminated so that the background areas of the foreground negatives are comparatively clear. Likewise the matte layer receives much more exposure in the foreground areas than in the background areas. Thus when the contrasty matte layer is developed to a high gamma, it is comparatively clear in the background areas and relatively opaque in the foreground areas.

In still another aspect the multilayer film has two matte layers which have high contrast and short latitude for exposing both of the aforesaid mattes simultaneously, the two layers being interconnected so that they may be stripped apart for separate development. By developing one layer to high contrast by direct development for use as a matte in blocking out one of the aforesaid parts of a scene and developing the other layer to high contrast by reversal development for use as a matte in blocking out the other of the aforesaid parts of the scene, both mattes may be made concomitantly instead of making one matte from the other. In the preferred embodiment of the invention the multilayer film comprises three layers, a normal panchromatic emulsion for the foreground and high contrast panchromatic emulsions with short latitude for the matte layers.

In making color pictures according to the present invention the aforesaid picture layer may record one of the color aspects of the scene, either by sensitizing the layer to only one of the color-separation ranges or by exposing it through a filter which passes only one of the light ranges. On the same film is exposed one or both of the aforesaid mattes. The other color-separation records may be exposed in other layers of the same film or on separate films. When exposed on separate films the other two films may be run through a second film gate in a split-scene camera, such as the one disclosed for example in Patents 1,889,030 and 2,072,091.

For the purpose of illustration a typical embodiment of the invention is illustrated in the accompanying drawings in which the single figure is a flow diagram indicating the successive steps of the process.

As illustrated at the top of the figure the film upon which the initial exposure is made comprises three emulsion layers 1, 2 and 3 superposed on a transparent base 4. The layers 1, 2 and 3 may be interconnected by thin adhesive layers which permit the layers to be peeled apart. While any of the many known adhesives for stripping purposes may be employed, those disclosed in Patent 2,367,665 are recommended.

After exposing the film to a scene in which either the foreground part or the background part reflects more light than the other part, the layers 1 and 2 are successively stripped off and transferred to separate transparent bases 5 and 6. Then the three films are separately developed. The normal panchromatic emulsion 1 may be developed to a gamma of approximately 0.70 for normal picture reproduction. The high contrast panchromatic emulsion layers 2 and 3 which have short latitude are developed to a high contrast. For example they may have a density of 2.0 or more in the highlight and 0.20 or less in the unexposed areas. As shown in the figure the layer 2 is subjected to direct development to form a foreground matte adapted to block out the foreground in printing background film, and the layer 3 is developed by the well-known reversal method to produce a background matte which blocks out the background in printing the foreground film. Obviously 3 might have the direct development and 2 the reversal development as this would also result in background and foreground mattes complementary to each other.

If the initial exposure is to a scene in which the foreground has normal illumination, with a black background underilluminated, layer 1 would produce a picture which, as illustrated, comprises a normal negative foreground and a relatively clear background. However if the conditions were reversed, with a normal background normally illuminated and a dark foreground underilluminated, the developed picture in layer 1 would comprise a normal record of the background area and be relatively clear in the foreground area. Instead of using a black background underilluminated it is possible to use a white background overilluminated, in which case the developed record in layer 1 would be relatively opaque in the background area and normal in the foreground area, the clear and opaque areas of layers 2 and 3 being reversed with respect to their relative positions in the illustration.

After the two mattes 2 and 3 have been made as aforesaid they are employed in the usual way. That is, matte 3 is superposed over the picture film 1 in printing the foreground on film C, after which the background is printed through matte 2 to produce a final composite picture C'. When it is desired to have the composite film C' in the form of a dupe negative, instead of a positive print, the negative 1 is developed by the reversal method instead of the direct method or a master positive is printed from the negative 1 and the prints C and C' are made from the master positives instead of from negatives.

It should be understood that the present disclosure is for the purpose of illustration only and that this invention includes all modifications and equivalents which fall within the scope of the appended claims.

I claim:

1. In the art of matte printing in which a composite picture is printed from separate records of the foreground and background respectively, the method which comprises exposing a film having a plurality of emulsion layers to the foreground and background parts of a scene in which one part reflects much more light than the other to form latent images in different layers respectively, separating the layers by transferring a layer to an individual support, developing one layer to normal contrast, developing one layer to high contrast to produce a matte, separately developing another layer to high contrast by reversal development to produce a matte, and printing the composite picture by blocking out the parts with the respective mattes.

2. In the art of matte printing in which a composite picture is printed from separate records of the foreground and background respectively, the method which comprises exposing a film having three adhesively joined emulsion layers to the foreground and background parts of a scene in which one part reflects much more light than the other to form latent images in different layers respectively, separating the three layers, processing one layer to normal contrast for depicting one part of the scene, processing another layer to produce a high contrast matte, processing the third layer to produce a second high contrast matte, one of said mattes being processed so that the two mattes are opposites with one having substantially opaque regions where the other has substantially transparent regions, printing one part of the composite picture while blocking out the other part with one matte, and printing the other part of the composite picture while blocking out the first part with the other matte.

3. In the art of matte printing in which a composite picture is printed from separate records of the foreground and background respectively, the method which comprises exposing a film having three emulsion layers to the foreground and background parts of a scene in which one part reflects much more light than the other to form latent images in different layers respectively, separating the three layers by transferring two layers to individual supports, developing one layer to normal contrast for depicting one part of the scene, developing the other two layers to high contrast to produce mattes, one of the matte layers being developed by a reversal method so that the two mattes are opposites, and printing the composite picture by blocking out the two parts with respective mattes.

4. In the art of printing a composite picture from separate records of the foreground and background respectively with mattes made by exposing film to the foreground and background parts of a scene in which one part is normal and the other part is black and underilluminated, the method which comprises exposing to said scene a multilayer film having one layer of normal contrast characteristics and two other layers of high contrast characteristics, the exposure being suitable for recording the normal part of the scene on the normal-contrast layer, separating the layers of the multilayer film by transferring layers to individual supports, developing the normal layer to a normal gamma for depicting the normal part of the scene, separately developing the contrasting layers to a high gamma to produce said mattes, one of the matte layers being developed by a reversal method so that the two mattes are opposites, and printing the composite picture by blocking out the parts with the respective mattes.

5. In the art of matte printing in which a composite color picture is printed from separate records of the foreground and background respectively, the method which comprises exposing a film having three emulsion layers to the foreground and background parts of a scene in which one part reflects much more light than the other to form latent images in different layers respectively, separating the three layers by transferring two layers to individual supports, developing one layer to normal contrast for depicting a color aspect of one part of the scene, separately processing another layer to produce a high contrast matte, separately processing the third layer to high contrast to produce a second matte, one of said mattes being processed so that the two mattes are opposites with one having substantially opaque regions where the other has substantially transparent regions, and printing the composite picture by blocking out the parts with the respective mattes.

WADSWORTH E. POHL.

REFERENCES CITED

The following references are of record in the file of this patent:

UNITED STATES PATENTS

| Number | Name | Date |
|---|---|---|
| 1,540,862 | Punnett | June 9, 1925 |
| 1,840,669 | Handschiegl | Jan. 12, 1932 |
| 1,846,230 | Stuber | Feb. 23, 1932 |
| 1,860,737 | Handschiegl | May 31, 1932 |
| 1,921,050 | Thornton | Aug. 8, 1933 |
| 1,955,993 | Williams | Apr. 24, 1934 |
| 2,024,081 | Williams | Dec. 10, 1935 |
| 2,028,975 | Gillette | Jan. 28, 1936 |
| 2,088,145 | Von Biehler | July 27, 1937 |
| 2,119,724 | Stand | June 7, 1938 |
| 2,130,777 | Planskoy | Sept. 20, 1938 |
| 2,134,546 | Barth et al. | Oct. 25, 1938 |
| 2,167,732 | Verkinderen | Aug. 1, 1939 |
| 2,297,582 | Rackett | Sept. 29, 1942 |
| 2,415,442 | Rackett | Feb. 11, 1947 |

FOREIGN PATENTS

| Number | Country | Date |
|---|---|---|
| 328,762 | Great Britain | May 8, 1930 |

OTHER REFERENCES

Clerc: Photography—Theory and Practice, published by Sir Isaac Pitman & Sons Ltd., London and New York, 1937, page 211.

Neblette: Photography, Principles and Practice, 4th Edition, published by D. Van Nostrand Co., Inc., New York city, New York, pages 428 to 430, 804 and 827.